May 19, 1970
P. REES
3,512,414
SLOTTED AIRFOIL SENSOR HOUSING
Filed May 23, 1968
2 Sheets-Sheet 1
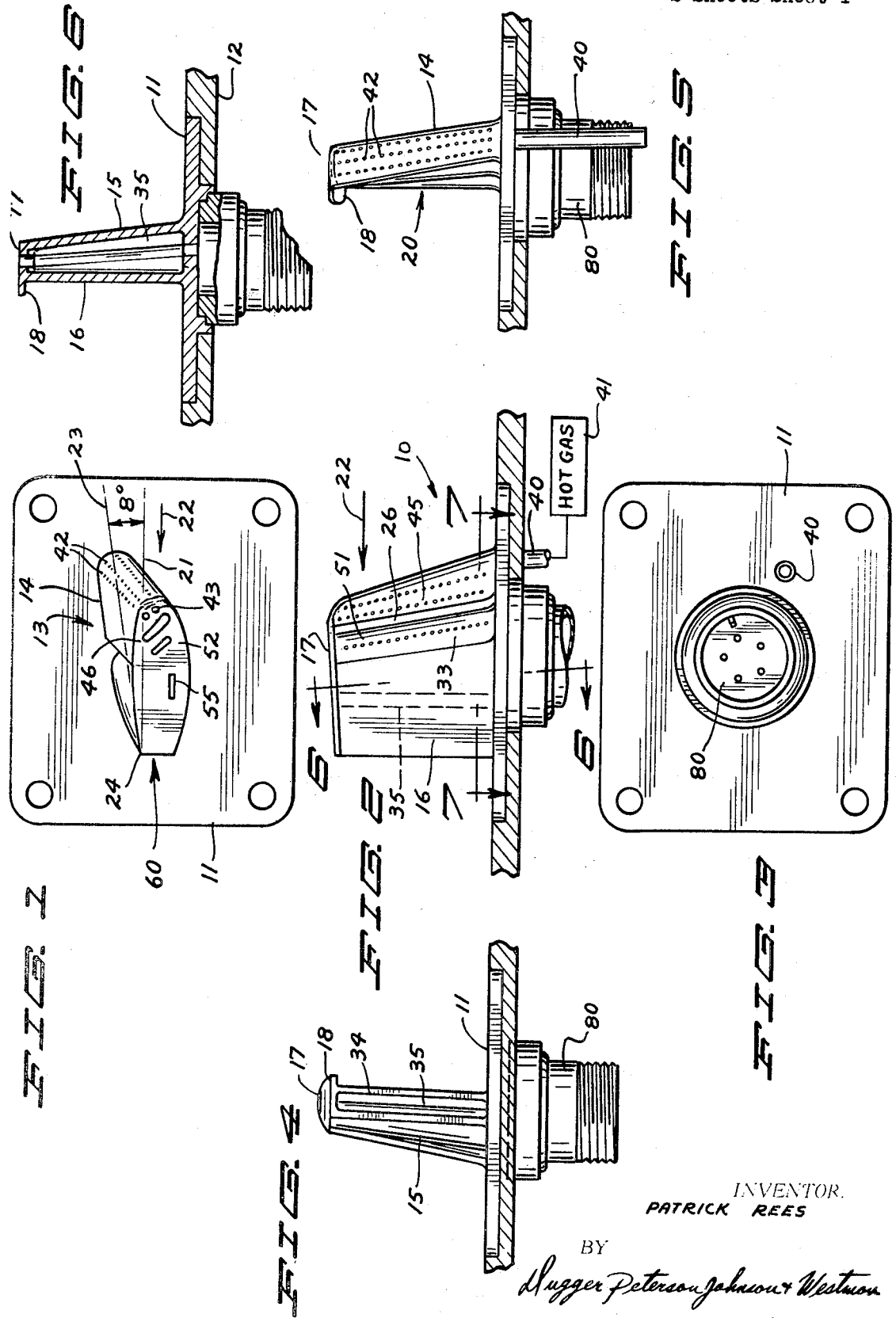
INVENTOR.
PATRICK REES
BY
Dugger Peterson Johnson & Westman
ATTORNEYS

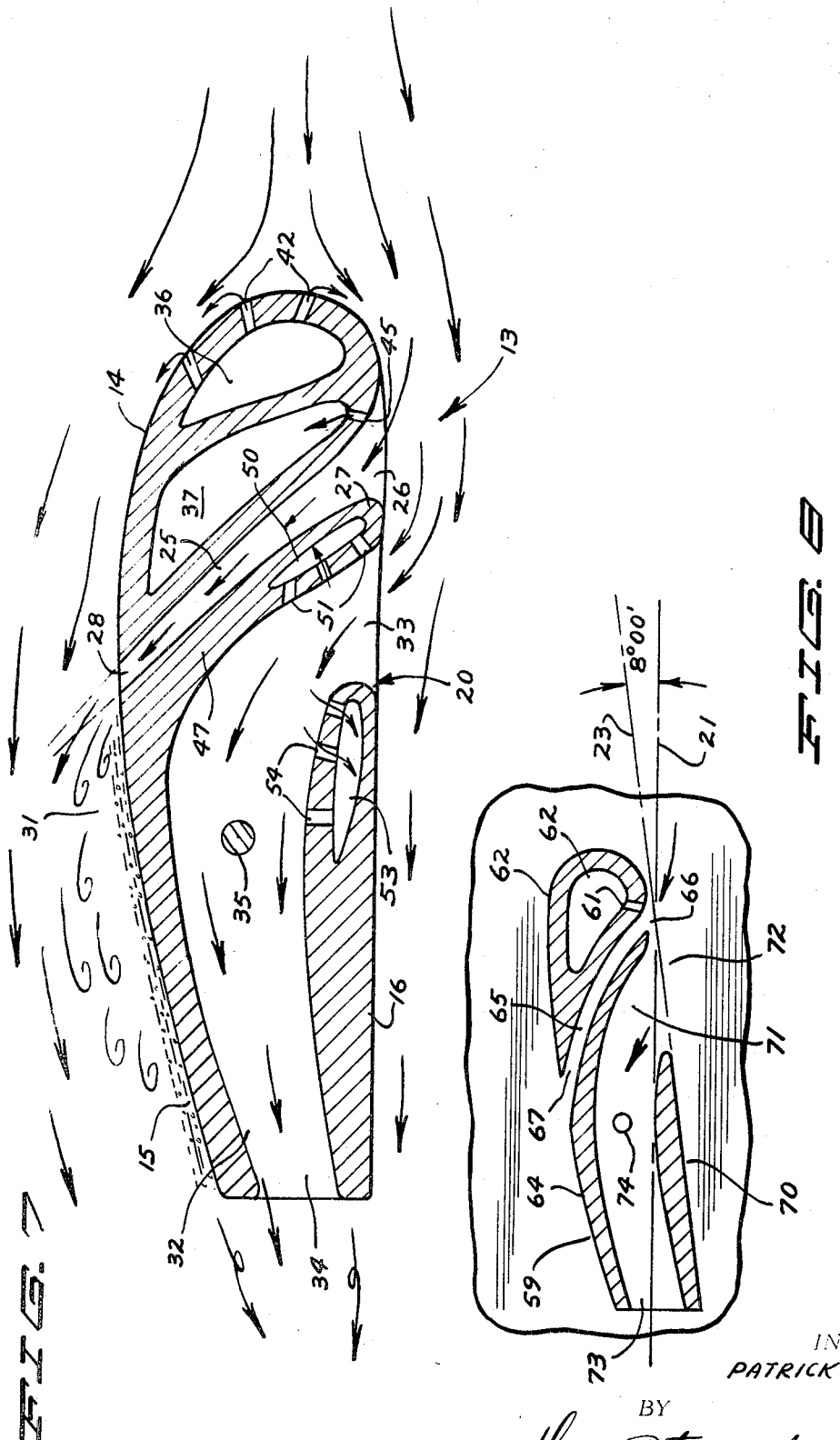

United States Patent Office 3,512,414
Patented May 19, 1970

3,512,414
SLOTTED AIRFOIL SENSOR HOUSING
Patrick Rees, Minnetonka Beach, Minn., assignor to Rosemount Engineering Company, Minnneapolis, Minn., a corporation of Minnesota
Filed May 23, 1968, Ser. No. 731,414
Int. Cl. G01k 13/02; 1/08; B64d 15/04
U.S. Cl. 73—349
13 Claims

ABSTRACT OF THE DISCLOSURE

A housing for a temperature sensing element for use in gas environment comprising an airfoil shaped member having slots therein positioned so that the gas stream to be sensed passes through one of the slots, and the temperature sensor is mounted in the slot. The sensor housing will prevent ingestion of most foreign objects and if an object is ingested the slot has clearance to prevent blockage of airflow. The sensor housing also has hot gas deicing provisions. The construction and shape of the sensor housing is such that when it is hit by foreign objects with a high level energy impact, it deforms rather than ruptures or detaches from its mounting. The deformation instead of detachment is particularly important because the sensor is normally mounted in the inlet of a gas turbine engine.

BACKGROUND OF THE INVENTION

Field of the Invention

This invention relates to air data sensors and more particularly to housing for such sensors.

Prior Art

The prior art total temperature sensors mounted in the intake areas of turbine engines have been subject to damage or malfunction. The inlet of a turbine engine is a very hazardous location because of high velocity foreign objects being ingested by the engine, vibration problems, and also because of the high velocity of the inlet air. Further, getting electrical power in position to deice the total temperature sensors in the engine inlets is difficult and therefore electrical deicing is not desirable.

The prior art sensors also have been susceptible to plugging from ingested insects or other objects, and in other cases high velocity objects such as hail striking the temperature sensor may break the sensor off from its mounting and the engine will have to digest the sensor. This causes damage to the engine. Another problem is the size of previous sensors. Some sensors have been too large and offer too much flow distortion for certain applications as in turbine engine inlets.

SUMMARY OF THE INVENTION

The present invention relates to a housing for an air data sensing element which is made to protect the element and provide minimum drag. The sensing element is located in a slot in the housing forming a bypass for gas flow. The gas flowing past the housing changes direction to enter the slot, and most objects carried by the air go past the slot. The housing itself, when struck by large objects is made so that it will not rupture from its base, but will rather deform. When used with a temperature sensing element the sensor includes unique hot gas deicing means, and also boundary layer control to ensure that the sensed temperature is the free stream temperature rather than that of the boundary layer.

The housing is made to minimize turbulence in the gas stream and is also designed to operate over a small range of angle of attack of the air stream which may be present at the inlet of a turbine engine.

BRIEF DESCRIPTION OF THE DRAWINGS

FIG. 1 is a top plan view of an airfoil sensor housing made according to the present invention;
FIG. 2 is a side elevational view of the device of FIG. 1;
FIG. 3 is a bottom plan view of the device of FIG 1;
FIG. 4 is a rear end elevational view of the device of FIG. 2;
FIG. 5 is a front end elevational view of the device of FIG. 2;
FIG. 6 is a sectional view taken as on line 6—6 in FIG. 2;
FIG. 7 is a sectional view of the sensor housing taken as on line 7—7 in FIG. 2; and
FIG. 8 is a sectional view of a modified form of the invention taken on the same lines as FIG. 7.

DESCRIPTION OF THE PREFERRED EMBODIMENTS

A sensor housing illustrated generally at 10 includes a mounting base 11 which can be mounted onto a portion 12 of an aircraft, for example, in the air intake of a turbine engine. The sensor is usually mounted so that the housing extends vertically upright from its base 11 when the aircraft is in normal flight. The sensor housing comprises a multipart airfoil shaped structure illustrated generally at 13. The housing includes a first or leading end section 14, a center or intermediate section 15, and a pressure side section 16. The three sections each also are airfoil shapes. The overall housing assembly 13 will be referred to as an airfoil section (made up of three separate sections) having slots therethrough. This will be the term "slotted airfoil" sensor housing.

The three sections 14, 15 and 16 are fixedly attached to the base 11, and at the outer end thereof are held together with a fence 17. As shown, the fence 17 becomes a pressure side fence because of the outwardly extending edge portions 18 on the pressure side of the housing. The slotted airfoil sensor housing has a twist in it, which increases the pressure on the inlet or pressure side of the housing indicated at 20. The twist is such that the chord line 21 of the airfoil shape outer fence 17 lies parallel to the direction of air movement indicated by arrow 22 in the normal instance, and the root or base end of the assembly has a chord line 23 which is twisted 8° from the chord line 21 of the fence. This increases the pressure of the gas on the pressure side 20 of the housing to insure that proper airflow through the slots in the housing is achieved and to secure some tolerance to angle of attack both positive and negative between the housing and local airflow. The twist is made from the trailing edge of the airfoil forwardly. At the trailing edge of the airfoil indicated at 24 in FIG. 1, the root and top of the airfoil housing are aligned and extend vertically upward from the top surface of the mounting member 11.

As can be seen in FIG. 7, in the first form of the invention, the first section 14 and the center section 15 define a slot 25 therebetween with an inlet opening 26 on the pressure side 20 of the airfoil. The center section 15 has an airfoil form rounded end 27 adjacent the slot, and the exit end of the slot 25 is shaped into a nozzle form 28 so that air ejecting from the inlet end 26 to the outlet end 28 increases in velocity as it ejects forming a turbulent layer generally shown at 31 on the negative pressure side of the housing and trailing the slot, and which turbulence trails clear of the downstream portions of the housing, leaving a dead air region along the housing face.

The pressure side section 16 and the inner section 15 also together define a second slot 32 extending from an inlet opening 33 on the pressure side 20 of the sensor to an outlet opening 34 at the rear of the sensor housing. The outlet opening 34 is right along the trailing edge. A temperature sensor 35 is mounted centrally located in the slot 32 and extends from the base 11 to the top fence 13 and is supported like a column in this slot.

The slot 32 begins with the inlet opening 33, widens out in the center portions, and narrows down at the outlet opening 34. The sensor 35 is positioned in the wider center portions of the slot 32. As shown, the inlet opening 33 is larger than the outlet opening to cause a temperature rise due to constriction of airflow through the slot 32 and provide a total temperature reading. The slot configuration can be varied to suit the sensing requirement.

The leading section 14 has two separated upright cavities or chambers 36 and 37 defined therein. The cavities 36 and 37 extend from the base out to the outer end of the outer fence. The first cavity 36 is connected through a connection pipe 40 to a hot gas source 41. Upon activation of suitable controls, hot gases will be discharged into the cavity 36, and out through a plurality of openings 42 defined in the leading edge of the section 14. There are vertical rows of these openings 42. As shown by the arrows, hot gas pouring out these openings 42 will flow around the leading end of the sensor and in this manner will deice the sensor. In addition, the top fence 17 has a plurality of openings 43 which also open to the cavity 36 so that hot gas coming out these openings will keep ice away from the edges and surfaces of the top fence as well. This is the deicing means for the sensor housing, and eliminates the need for electrical deicing. The source of hot gas, of course, is normally compressor bleed air from the engine on which the housing is located as there is an abundant supply of hot gases in a turbine engine. The plumbing connection is easy to make and any desired type of control can be used.

The cavity 37 has a plurality of openings 45 leading therefrom and positioned in a vertical row just adjacent the inlet opening 26 to the slot 25. This vertical row of openings 45 serve as a boundary layer control means, and air impinging on the leading edge of the airfoil housing will flow around the leading surface and pass into the inlet opening 26. Part of the boundary layer along the leading edge of the housing will then flow into the openings 45, then into cavity 37, and out the discharge opening 46 in the top fence.

It should be noted that the fence 17 is at a negative angle from front to back, so that the airflow from front to back will cause a negative pressure along the top of the fence which will aid in exhausting the boundary layer air entering openings 45 and passing out through the cavity 37. The center section 15 of the housing has a laterally extending portion 47 which is used to define one side of the slot 25 and the rounded end portion 27 of this section 47 is also provided with a cavity 50 which extends uprightly between the base 11 and the fence 17. The section 47 has a plurality of openings 51 arranged in vertical rows opening into the cavity 50 from the side of the section 47 defining the slots 32, and these openings 51 are right adjacent the inlet 33 to the slot 32. A discharge opening 52 is provided in the fence 17 and this opens to the cavity 50 so that the boundary layer of air coming into the cavity through holes 51 will discharge out opening 52.

The third section 16 on the pressure side of the airfoil housing assembly 13 also has an airfoil cross sectional shape as shown in FIG. 7, and has an upright cavity 53 defined therein that extends from the base 11 up to the fence. The section 16 defines one side of the slot 32, as shown, and has a plurality of openings 54 defined therein adjacent the leading edge and opening into the cavity 53. The openings 54 are arranged in uprightly extending rows, and air flowing in through the inlet 33 of the slot 32 and passing along the inner surface of the section 16 will be bled off through the openings 54 and exhausted out through a top opening 55 in the fence 17. The opening 55 opens from the cavity 53.

Also, it should be noted that the front section 14 has a leading edge that is raked or swept back rearwardly from the root to insure that any foreign object impacting or striking the leading end has a significant vertical component of force tending to load the housing in compression rather than in shear, to help in preventing the shearing off of the sensor housing from its base if it is struck by some object ingested by the engine so that it would be passed through the engine.

As air flows through the sensor housing, as shown, it will strike the leading edge, and assuming that it is coming parallel to the chord of the pressure fence 17, air will enter the leading slot 25 and flow from the inlet 26 to the outlet 28. The boundary layer of air coming from the leading section 14 will be removed through the openings 45. This first slot 25 will also carry droplets of water, and/or oil, or other small foreign particles carried in the gaseous stream and will exhaust these out the leeward side of the sensor housing. In addition, it will tend to start to turn the air stream in toward the sensor housing so that the air flowing on the pressure side of the housing to the rear of the slot 25 will be turning in toward the sensor and will easily enter the inlet opening 33 of the second slot 32. Here, the boundary layer control openings 51 and 54 will remove the boundary layer of air flowing into the housing slot 32 so that the air reaching the sensing element 35 will be substantially at free stream temperature and will not be affected by the boundary layer conditions. The sensing element 35 will sense the total temperature of the gaseous stream to a high degree of accuracy. The inlet 33 has a larger area than the outlet of the slot 32 to control flow, so that the total temperature of the gaseous stream is sensed.

If deicing is necessary, hot air or gas under pressure will be discharged into the cavity 36 through the tube 41 and this will exhaust out through the openings 42 and flow around the leading edges of the sensor housing as well as along the top surface of the fence 17. The hot gas coming out through the openings 42 and along the leading surface will be largely removed by the boundary layer control openings 45 along the leading side of slot 25 and by the slot 25 itself. The boundary layer control openings 51 and 54 in the second slot 32 further insure bleeding off of the heated gases. This means that gas coming out through the openings 42 will not adversely affect the temperature sensed by the sensing element 35.

Thus, it can be seen that the advantages of a sensor housing having good boundary control, adequate deicing, and sound structural construction is achieved using the airfoil design of the present invention. The air being sensed is actually turned out of the main part of the air stream so that objects will tend to continue past the openings 26 or 33 and even if small objects do enter these openings, these openings are large enough so that they will not be plugged easily. The housing also presents a minimum frontal facing area, to minimize ingestion of objects, and to minimize distortion of the engine inlet flow. Objects striking the frontal surface will be deflected away so they will not damage the sensor. The housing does not have an opening facing forwardly to act as a scoop for foreign objects.

The three section formation of the slotted airfoil housing permits a "cascade" deformation by large objects striking the edge. Again, the sweeping back of the leading edge permits a vertical component of objects striking the leading edge with great force. This will cause impact energy on being struck by a large object to be dissipated by deforming the housing in a specific sequence. First the front section will fail, then the second section and finally the third section without rupturing or shearing off from its base 11.

FIG. 8 shows a cross section of a slotted airfoil housing 59 of a modified form of the present invention which can be used where there is no requirement for deicing. The base 11 and the outer fence 17 would be arranged the same way, but the forward section 16 would not have any outlet openings for heated gases. The section would have openings 61 leading to the cavity 62 which again would exhaust out through the top fence as in the previous forms of the invention. However, the openings 61 would be only for boundary layer air control. The center section 34 would define, in cooperation with the first section 60 the first or leading slot 65 having an opening 66 which air would flow and a discharge outlet 67. The third section 70 is positioned on the pressure side of the assembly 59 and this also has an airfoil cross sectional shape and together with the center section 64 defines a second slot 71 having an inlet opening 72 and an outlet opening 73. A temperature sensing element 74 is positioned in slot 71 to sense the total temperature of the gas flow coming in through the slot. The boundary layer control openings 61 provide adequate boundary layer control, and the first slot 65 which is leading in the direction of flow tends to turn the air before it gets to the slot 71, and thus air flowing past the sensor will turn and enter the slot 71 very easily and with little turbulence. Large objects, such as hail stones, pieces of metal, birds and the like will tend to not follow this turning air stream and will be thrown directly past the sensor without entering the slot 71 or the slot 65. Again, here, the sensor 74 would extend between the base and the outer fence. The twist between the tip and the root of the sensor housing 59 would still be present, and also the rearwardly swept back leading section would be used to minimize the likelihood of having the housing shear off when foreign objects strike it. The inlet opening 72 is of larger size than the outlet opening 73 to cause a constriction of flow and obtain a controlled gas flow through the sensor housing.

As shown in FIGS. 3 and 4, a suitable connector 80 can be used for connecting temperature sensing elements to circuitry in the aircraft.

The edge section 18 on the fence 17 positioned on the pressure side of the sensor housing increases the pressure on the pressure side of the housing so that air will always enter into the inlet of the slot 32 and flow in the proper direction past the sensor. Further, the twist between the tip and the root of the sensor housing is to make sure that the pressure side of the housing will remain under a positive pressure even if the angle of attack of the airflow changes slightly. In the intake of turbine engines, and with sensors positioned very close to the actual air entrance, angle of attacks of the airflow change. The present design will operate up to about plus or minus 8 to 10°.

In addition to temperature sensor, gas sampling tubes or other transducer types such as pressure, density and humidity detectors also could be used with the slotted airfoil housing to great advantage.

The nozzle effect at the discharge end of slot 25 causes turbulence to exist, separated by a stagnation region which lies along the outer wall of section 15 to the rear of the outlet. This stagnation region tends to minimize heat transfer to the sensor through the wall of the section 15. If necessary, the sensing element can be shielded from radiated housing heat by the addition of thin metallic shields on either side.

It should be noted that the leading slot 25 or 65 serves as a boundary layer control even without separate openings. The boundary layer of air of the frontal facing surfaces of the housing will be exhausted out through this slot without affecting the temperature sensor in the second slot. Additional boundary layer control is obtained with the vertical rows of openings.

What is claimed is:

1. A device for protecting a sensor used for sensing data from a gaseous medium comprising a base member, a housing projecting from said base and comprising a generally airfoil shaped cross section having a leading edge, a pressure side, and a trailing edge, said leading edge receiving the impingement of the gaseous medium which the sensor is to sense, means defining a slot in said housing having an inlet on the pressure side of said housing and an outlet to the rear of the inlet and opening into an area of lower pressure than on the pressure side with flow generally in direction from said leading edge to said trailing edge past said housing, said housing including means for diverting boundary layer air from adjacent the leading edge of said housing prior to the time it reaches the entrance to said slot, and a gaseous medium data sensing unit positioned in said slot.

2. A device for mounting a sensor for sensing data from a gaseous medium comprising a base member, a housing projecting from said base and comprising a generally airfoil shaped cross section having a leading edge, a pressure side, and a trailing edge, said leading edge receiving the impingement of the gaseous medium which the sensor is to sense, means defining a first slot in said housing having an inlet on the pressure side of said housing and an outlet to the rear of the inlet and opening into an area of lower pressure than on the pressure side with flow generally in a normal direction from said leading edge to said trailing edge past said housing, said housing having a forward portion defining the leading edge, a cavity defined in said forward portion and extending along the length thereof, a plurality of openings defined through a forward wall of said forward portion and opening into said cavity, means applying hot gas under pressure to said cavity to thereby exhaust heated air out through said openings to flow along the leading edge of said housing, and means defining a second slot in said housing, said second slot having a second inlet opening on the pressure side of said housing and a second outlet opening at an area of lower pressure than on the pressure side of said housing with flow in said normal direction past said housing, said second inlet opening being positioned ahead of the inlet of said first slot with respect to the direction of flow past said housing, and a gaseous medium data sensing unit positioned in said first slot.

3. A device for mounting a sensor for sensing data from a gaseous medium comprsing a base member, a housing projecting from said base and comprising a generally airfoil shaped cross section having a leading edge, a pressure side, and a trailing edge, said leading edge receiving the impingement of the gaseous medium which the sensor is to sense, means defining a slot in said housing having an inlet on the pressure side of said housing and an outlet to the rear of the inlet and opening into an area of lower pressure than on the pressure side with flow generally in direction from said leading edge to said trailing edge past said housing, an outer end member on said housing opposite from said base comprising a planar fence member having an ouwardly extending ledge section projecting out from the surface forming the pressure side of said housing, and a gaseous medium data sensing unit positioned in said slot.

4. The combination as specified in claim 3 wherein said fence member tapers toward the base of said housing in direction from the leading edge of said housing to the trailing edge of said housing.

5. The combination specified in claim 2 wherein said first slot has a portion that extends generally in the same direction as the gas flow past the housing, and wherein the outlet opening of said first slot is defined in the trailing edge of said housing.

6. The combination as specified in calim 5 wherein said first and second slots together divide said housing generally into three sections comprising a leading section, an intermediate section, and a pressure side section, and wherein said leading section has a second cavity extending from the base to the outer end of said housing, the rearward portions of said first section having a surface defining one side of said second slot, a plurality of openings through the wall of said first section opening into said second cavity, said openings being positioned so that they are adjacent the inlet end of said second slot and are not directly impinged by the said gaseous stream, and an exhaust opening defined in said housing and opening into said second cavity.

7. The combination as specified in claim 6 and third and fourth cavities defined in said second and third sections of said housing respectively, a plurality of inlet openings in each of the second and third sections opening into the respective cavities, said inlet openings being positioned to bleed off the boundary layer of air entering the inlet of said second slot, and exhaust opening defined in the respective cavities.

8. The combination as specified in claim 6 wherein the outlet opening for said second slot is positioned with respect to a lower pressure side of said housing to create a dead air region adjacent the surface of said housing immediately rearwardly of said outlet opening for said second slot.

9. The combination as specified in claim 2 wherein said second slot extends generally transversely and rearwardly, and wherein the outlet opening of said slot exhausts on the negative pressure side of said airfoil shaped housing.

10. The combination as specified in claim 1 wherein the inlet to said first slot is of larger size than the outlet, and wherein the sensor unit is a temperature sensor.

11. The combination as specified in claim 10 wherein the outer end of the housing has a chord line extending parallel to the normal direction of flow past the housing, and wherein the base of the housing is skewed at a small angle to the flow direction so that flow partially impinges on the pressure side of said housing, and wherein the forward portion of the housing inclines rearwardly from the base to the outer end of the housing.

12. A mounting housing for a fluid data sensing device, said housing having an elongated longitudinal axis and an airfoil shaped peripheral cross section taken along a plane normal to the longitudinal axis, said cross section including a generally curved surface along one side thereof extending along the longitudinal axis, a rounded leading edge surface, and a relatively planar side surafce forming the side opposite from said curved surface, and generally imperforate continuous surface means defining a slot in the housing having an inlet on the relatively planar side of said housing, and an outlet in a portion of the housing downstream from the inlet and opening into an area having lower pressure than the inlet of the housing when fluid is flowing so that it generally impinges upon said leading edge portion, and a fluid data sensing device positioned in said slot and between the surface means defining said slot.

13. A device for mounting a sensor for sensing data from a fluid stream comprising a housing having a leading end portion, a trailing end portion and at least two surface means between the leading and trailing end portions shaped so one of said surface means is a high pressure surface when said leading end receives impingement of the fluid stream, means defining a first slot forming a fluid flow channel in said housing having an inlet opening to the pressure surface of said housing and having an outlet to the rear of the inlet and opening into an area of lower pressure than on the pressure surface with fluid stream flow generally in a normal direction from said leading end to said trailing end past said housing, and means defining a second slot forming a fluid flow channel in said housing, said second slot having a second inlet opening to the pressure surface of said housing and a second outlet opening into an area of lower pressure than the pressure surface of said housing with flow in said normal direction, said second inlet opening being positioned ahead of the inlet of said first slot with respect to the direction of fluid flow past said housing, and a fluid data sensing unit positioned in said first slot between the inlet and outlet thereof.

References Cited

UNITED STATES PATENTS

| 2,414,370 | 1/1947 | Floyd. | |
| 2,625,010 | 1/1953 | Clark | 244—134 XR |
| 3,000,213 | 9/1961 | Eves et al. | 73—349 |
| 3,216,258 | 11/1965 | Spencer et al. | 73—349 |
| 3,348,414 | 10/1967 | Waters et al. | 73—343 XR |

S. CLEMENT SWISHER, Primary Examiner

F. SHOON, Assistant Examiner

U.S. Cl. X.R.

73—343, 346; 244—134